United States Patent
Takahashi

(10) Patent No.: US 7,287,630 B2
(45) Date of Patent: Oct. 30, 2007

(54) TORQUE CONVERTER WITH LOCKUP CLUTCH

(75) Inventor: Shigeo Takahashi, Anjo (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 178 days.

(21) Appl. No.: 11/089,152

(22) Filed: Mar. 25, 2005

(65) Prior Publication Data

US 2005/0211523 A1  Sep. 29, 2005

(30) Foreign Application Priority Data

Mar. 26, 2004  (JP) ............................. 2004-093688

(51) Int. Cl.
*F16H 45/02* (2006.01)
(52) U.S. Cl. .................................................. 192/3.29
(58) Field of Classification Search ...................... None
See application file for complete search history.

(56) References Cited

U.S. PATENT DOCUMENTS

| | | | | |
|---|---|---|---|---|
| 3,502,166 A | * | 3/1970 | Christenson et al. | 180/55 |
| 4,423,803 A | * | 1/1984 | Malloy | 192/3.29 |
| 4,667,541 A | * | 5/1987 | Shimaoka et al. | 477/61 |
| 5,070,974 A | * | 12/1991 | Kirkwood | 192/3.3 |
| 5,320,202 A | * | 6/1994 | Wakahara | 192/3.3 |
| 5,441,135 A | | 8/1995 | Worner et al. | |
| 6,390,263 B1 | * | 5/2002 | Arhab | 192/3.29 |
| 6,419,059 B1 | * | 7/2002 | Nobu et al. | 192/3.3 |
| 2003/0066726 A1 | * | 4/2003 | Saito et al. | 192/3.29 |

FOREIGN PATENT DOCUMENTS

JP  2001-116110  4/2001

* cited by examiner

*Primary Examiner*—Rodney H. Bonck
(74) *Attorney, Agent, or Firm*—Buchanan Ingersoll & Rooney PC

(57) ABSTRACT

A torque converter with a lockup clutch includes a fluid passage into which flows operation oil supplied from a converter chamber, which is surrounded by the pump impeller and the turbine runner, to a lockup chamber in which engagement and disengagement of the lockup clutch are performed, the fluid passage being connected to an oil drain passage for the operation oil without passing through an engaging portion of the lockup clutch, and a valve formed at a point on the fluid passage and capable of controlling a flow amount of operation oil.

11 Claims, 6 Drawing Sheets

Large pressure (low temperature)

Small pressure (high temperature)

TORQUE CONVERTER WITH LOCKUP CLUTCH

CROSS REFERENCE TO RELATED APPLICATIONS

This application is based on and claims priority under 35 U.S.C. § 119 to Japanese Patent Application 2004-093688, filed on Mar. 26, 2004, the entire content of which is incorporated herein by reference.

FIELD OF THE INVENTION

This invention generally relates to a torque converter with a lockup clutch.

BACKGROUND

A known torque converter with a multi-disc type lockup clutch for transmitting power by appropriately engaging a pump impeller and a turbine runner with each other can cool down or radiate with a degree of certitude heat from multiple clutch plates provided in the lockup clutch. Such a torque converter is disclosed in U.S. Pat. No. 5,441,135 and Japanese Patent Application No. 2001-116110.

According to the torque converter with a lockup clutch disclosed in the U.S. Pat. No. 5,441,135, a support piece for supporting friction discs of a lockup clutch in an axial direction, and a working pressure chamber (piston chamber) for accommodating an axial piston of a clutch member are provided so that the support piece and the working pressure chamber are prevented from relatively moving to annular friction disc carriers. The friction discs are alternately and torsionally held on two annular friction disc carriers and subjected to a centripetal flow between a turbine wheel outlet and a torque converter return conduit.

Further, according to the torque converter with a lockup clutch disclosed in the Japanese Patent Application No. 2001-116110, a throttle passage structure is provided between a converter chamber and a torque converter oil drain passage. A lockup chamber has a closing structure between a space formed by a turbine runner and a torsion damper, and the torque converter oil drain passage, so that oil introduced from the converter chamber into the lockup chamber is discharged into the torque converter oil drain passage via the lockup clutch.

According to each of the aforementioned torque converters with a lockup clutch, operation oil is controlled at a predetermined pressure level at the source of oil pressure, and then guided into the converter chamber from an oil supply passage. Then, the operation oil flows into the lockup chamber by passing through a gap formed between a turbine assembly and a converter cover, and is delivered to the oil drain passage via the multi-disc lockup clutch. Operation oil generates heat when a rotational difference between the pump impeller and the turbine runner of the torque converter is large (i.e. a slip ratio is high) and then a temperature of operation oil is increased. Operation oil discharged from the oil drain passage is generally delivered to a lubricating system of each portion of an automatic transmission main body after being cooled down in a cooler, and then returned to an oil pan. Operation oil stored in the oil pan is pumped again so as to be controlled at a predetermined pressure level, and guided to the converter chamber. That is, operation oil is maintained at a substantially constant pressure level in the converter chamber. Heat generated in the torque converter is accordingly discharged to the outside via operation oil.

Since operation oil flowing through the gap formed between the turbine assembly and the converter cover circulates by passing through gaps formed in the clutch discs of the lockup clutch, in a case where the lockup clutch is in engagement state, no gaps are formed between the clutch discs. The flow of operation oil is prevented, and thus results in a reduction in the flow amount of operation oil. Meanwhile, a flow resistance in the oil drain passage is not changed and thus pressure is reduced in a void formed on a side of the lockup chamber relative to a piston for lockup, which is in the vicinity of the oil drain passage. The pressure of operation oil applied to the piston chamber is controlled separately from that applied to the converter chamber, and is thus not influenced by the temperature of operation oil in the converter chamber, or in the lockup chamber. Therefore, when the pressure of operation oil in a portion surrounded by the piston for lockup and the lockup clutch is changed, a force for engaging the clutch is changed even if the pressure of operation oil in the piston chamber is at a constant level.

Further, the pressure in the converter chamber is high when the temperature of operation oil is high while the pressure is low when the temperature of operation oil is low. In a case where the temperature of operation oil increases by the heat generated in the torque converter, viscous resistance of operation oil diminishes, the amount of discharge from the torque converter increases and as a result pressure in the converter chamber drops.

Thus, a need exists for a torque converter with a lockup clutch that can prevent a change of oil pressure in a portion surrounded by a piston for lockup and a lockup clutch.

Further, a need exists for a torque converter with a lockup clutch that can prevent pressure in a converter chamber from decreasing even when the temperature of oil becomes high. The present invention has been made in view of the above circumstances and provides a torque converter that meets both criteria.

SUMMARY OF THE INVENTION

According to an aspect of the present invention, a torque converter with a lockup clutch includes a fluid passage into which flows operation oil supplied from a converter chamber, which is surrounded by the pump impeller and the turbine runner, to a lockup chamber in which engagement and disengagement of the lockup clutch are performed, the fluid passage being connected to an oil drain passage for the operation oil without passing through an engaging portion of the lockup clutch, and a valve formed at a point on the fluid passage and capable of controlling a flow amount of operation oil.

According to another aspect of the present invention, a torque converter with a lockup clutch includes an oil hole formed on a predetermined member and into which flows operation oil supplied from a converter chamber, which is surrounded by the pump impeller and the turbine runner, to a lockup chamber in which engagement and disengagement of the lockup clutch are performed, the oil hole being connected to an oil drain passage for the operation oil without passing through an engaging portion of the lockup clutch, and a valve member provided on a downstream side of the predetermined member and capable of controlling a flow amount of operation oil passing through the oil hole.

According to further another aspect of the present invention, a torque converter with a lockup clutch includes an oil hole formed on an outer shell of the turbine runner and into which flows operation oil supplied from a converter chamber, which is surrounded by the pump impeller and the turbine runner, to a lockup chamber in which engagement and disengagement of the lockup clutch are performed, and a valve member provided on an inner wall face side of the outer shell and capable of controlling a flow amount of operation oil passing through the oil hole.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

Figure 1:
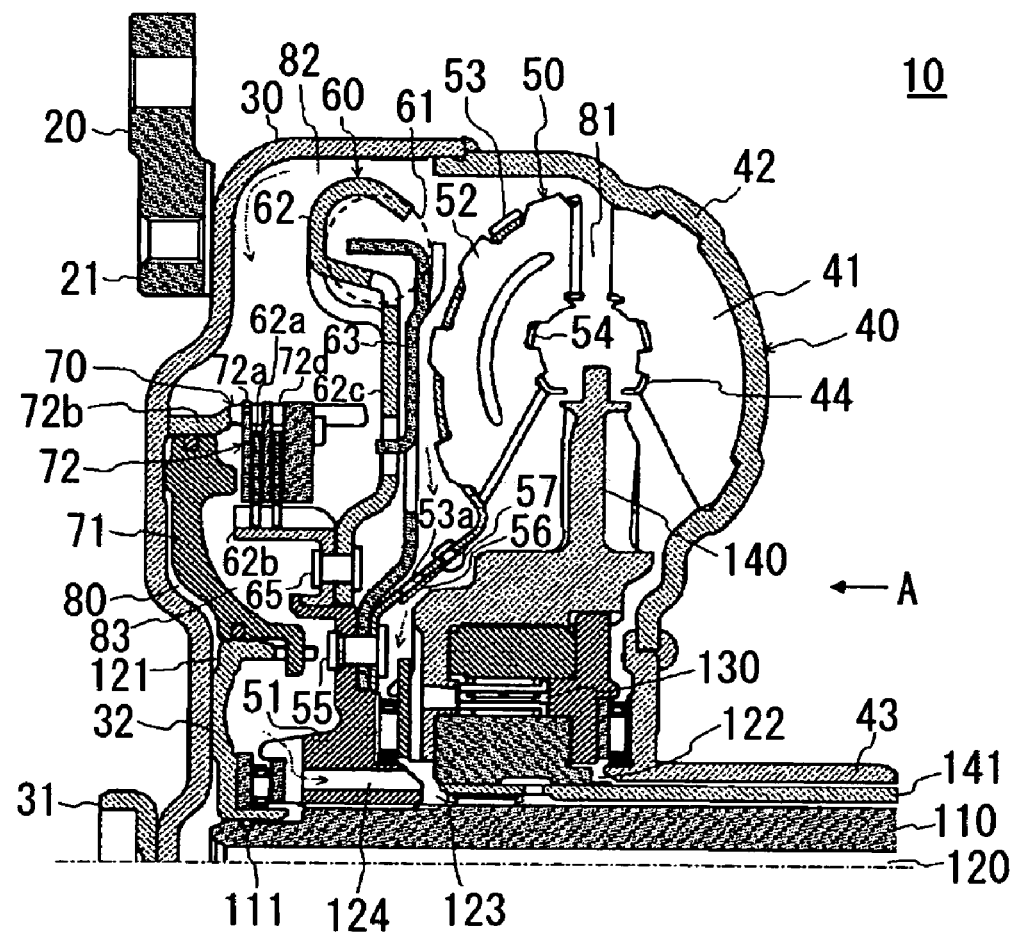
FIG. 1 is a partial cross-sectional view showing a structure of a torque converter with lockup clutch according to a fist embodiment of the present invention.
Figure 2:
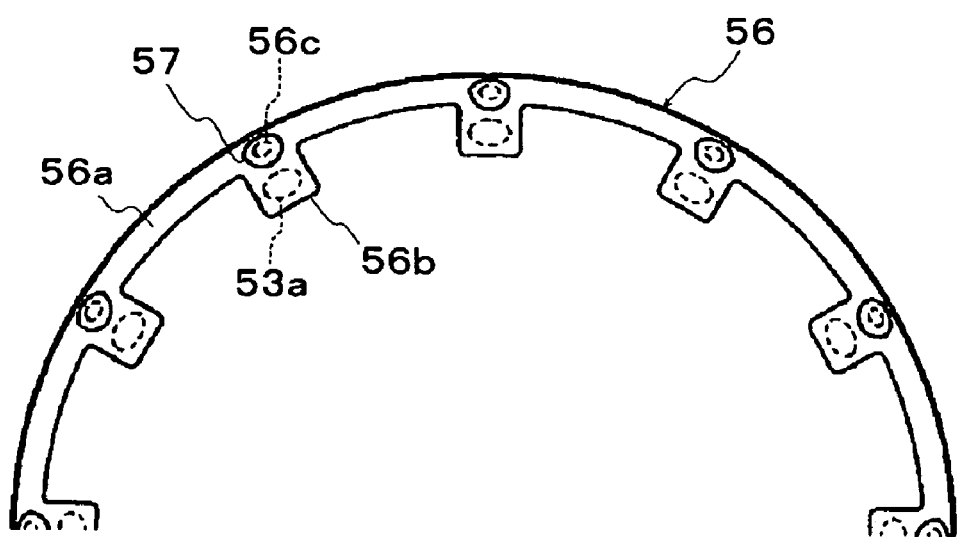
FIG. 2 is a partial plane view showing a structure of a valve member of the torque converter with lockup clutch according to the first embodiment of the present invention.
Figure 3A:
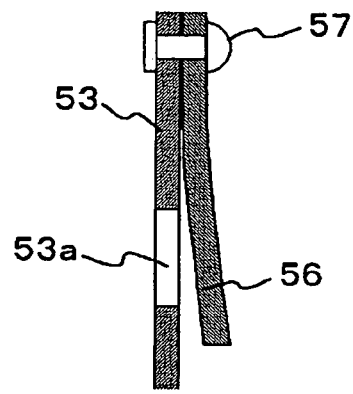
FIG. 3A and FIG. 3B are enlarged partial cross-sectional view for explaining an operation of the valve member of the torque converter with lockup clutch according to the first embodiment of the present invention.
Figure 3B:
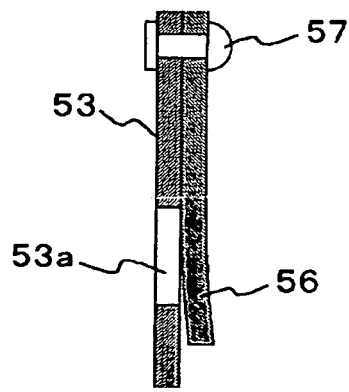
Figure 4:
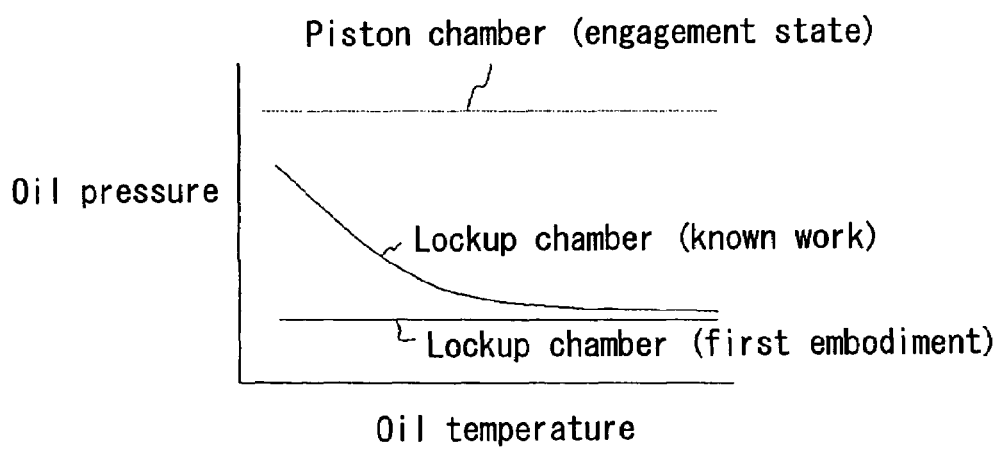
FIG. 4 is a graph for explaining a relationship between pressure and temperature of operation oil in a lockup chamber of the torque converter with lockup clutch according to the first embodiment of the present invention.

A first embodiment of the present invention is explained with reference to the attached drawings. FIG. 1 is a partial cross-sectional view showing a structure of a torque converter with a lockup clutch according to the first embodiment. FIG. 2 is a partial plane view showing a structure of a valve member of the torque converter with a lockup clutch according to the first embodiment. FIG. 3 is an enlarged partial cross-sectional view for explaining an operation of the valve member of the torque converter with a lockup clutch according to the first embodiment. FIG. 4 is a graph illustrating a relationship between pressure and temperature of operation oil in a lockup chamber of the torque converter with a lockup clutch according to the first embodiment.

As shown in FIG. 1, a torque converter with a lockup clutch 10 includes a setting block 20, a front cover 30, a front cover hub 32, a pump impeller 40, a turbine runner 50, a dumper 60, a lockup clutch 70, a piston chamber 80, a converter chamber 81, a lockup chamber 82, an input shaft 110, a shaft oil passage 120, a lockup oil passage 121, an oil supply passage 122, an oil drain passage 123, a on-way clutch 130, a stator 140, and a stator shaft 141.

The setting block 20 is arranged on an outer circumferential side of the piston chamber 80, and at the same time on an outer side of the front cover 30, i.e. on an engine side. The setting block 20 is constituted by an arc-shaped plate member on which a block portion 21 is formed. The appropriate number of setting blocks 20 with block portions 21 are connected to the front cover 30 by a means such as welding in such a manner that the setting blocks 20 are arranged at even intervals on an identical circumference of the front cover 30. A drive plate (not shown) driven by engaging with a pinion gear of a cell motor for an engine start is bolt-tightened to the setting block 20.

The front cover 30 is connected to an engine (not shown) via the setting block 20. In addition, the front cover 30 includes a center portion in which a center piece 31 concentrically arranged with a crankshaft of the engine is fixed by a means such as welding, a front wall portion, a peripheral wall portion, and a convex portion. In the front wall portion, a portion facing a bolt head (not shown) for fixing the drive plate to an edge portion of the crankshaft is formed in a rearward position, as seen from the center portion, i.e. formed at a position away from the engine, so that the facing portion is prevented from interfering with the bolt head. Then, an outer circumferential side of the facing portion is formed in a forward position, i.e. formed at a position close to the engine, and a further outer circumferential side to which the setting block 20 is attached is formed at a rearward position, as seen from the center portion where the center piece 31 is fixed. The peripheral wall portion extends axially from an outermost peripheral side of the front wall portion. The convex portion includes a contacting portion to the pump impeller 40 that, because of the provision of a stepped portion from the peripheral wall portion, assumes a somewhat enlarged diameter. An annular front cover hub 32 is arranged on a radially inner side of the front wall portion of the front cover 30 so as to be in contact with the front cover 30 from an inner side thereof, and by a means such as projection welding is fixed to the front cover 30 via three positions on the circumference.

The front cover hub 32 is fixed to the front cover 30 by a means such as projection welding, or spot welding. An edge portion of the input shaft 110 engages with an inner diameter portion of the front cover hub 32 in such a manner that the input shaft 110 is relatively rotatable and water-tightened to the front cover hub 32 (see FIG. 1). An outer peripheral face of the front cover hub 32 functions as a cylinder inner peripheral face on which a piston 71 is slidably moved in an axial direction of the input shaft 110. A ring seal 111 is arranged for sealing an outer periphery of the input shaft 110 and an inner periphery of the front cover hub 32.

The pump impeller 40 is integrally connected to the front cover 30, as shown in FIG. 1. The pump impeller 40 includes an outer shell 42 in which multiple blades 41 are implanted. In addition, the pump impeller 40 includes an impeller hub sleeve 43 integrally welded to an inner periphery of the pump impeller 40. An axially end portion of the impeller hub sleeve 43 is connected to an oil pump gear (not shown). Further, the pump impeller 40 includes an inner core 44 on an inner edge side of the blade 41.

The turbine runner 50 is arranged so as to face the pump impeller 40, and is connected to the input shaft 110 of a transmission (not shown) via a turbine hub 51, as shown in FIG. 1. The turbine runner 50 includes an outer shell 53 in which multiple blades 52 are implanted, in the same way as the pump impeller 40, and an inner core 54 on an inner edge side of the blade 52. By means of bending and extending in an inner peripheral direction, the outer shell 53 is connected, together with a driven plate 63 of the dumper 60, to the turbine hub 51 via a rivet 55. The outer shell 53 includes an oil hole 53a serving as an oil passage in the vicinity of the rivet 55. The turbine hub 51 is connected to the input shaft 110 such that an inner peripheral spline of the turbine hub 51 engages with an outer peripheral spline of the input shaft 110.

A valve member 56 is arranged and fixed by a rivet 57 on an inner wall side face of the outer shell 53, i.e. a face facing an oil drain passage 123. The valve member 56 appropriately opens or closes the oil hole 53a formed on the outer shell 53. In addition, as shown in FIG. 2, the valve member 56 includes an annular portion 56a equipped with multiple holes 56c, and a tongue-shaped portion 56b extending in an inner circumferential side of the annular portion 56a. FIG. 2 is a partial plane view of an inner wall face of the outer shell 53, as viewed from an arrow A in FIG. 1. In a case where the valve member 56 is made of thin-plate spring steel, for example, the valve member 56 is constituted so as to close the oil hole 53a in an assembled condition. When the pressure outside the outer shell 53 is higher than that inside the outer shell 53, i.e., a difference in pressure between the lockup chamber 82 and the oil drain passage 123 is large, an opening between the valve member 56 and the oil hole 53a becomes wide, as shown in FIG. 3A. When the pressure outside the outer shell 53 is lower than that inside the outer shell 53, an opening between the valve member 56 and the oil hole 53a narrows, as is shown in FIG. 3B. In a case where the valve member 56 is made of a temperature-sensitive member such as a bi-metal, or a shape-memory alloy, an opening between the valve member 56 and the oil hole 53a becomes wide when the oil temperature is low, as is shown in FIG. 3A, and narrows when the oil temperature is high, as is shown in FIG. 3B.

The dumper 60 is arranged on an outer circumferential side of the lockup clutch 70, as is shown in FIG. 1. The dumper 60 includes a damper spring 61 consisting of multiple cylindrical coil springs, a drive plate 62 in contact with one end of the damper spring 61, and a driven plate 63 in contact with the other end of the damper spring 61. The drive plate 62 includes a hub plate 62b for supporting a friction disc 62a, and a plate 62c on which a notch is formed for accommodating the damper spring 61 and engaging with an end portion of the damper spring 61. The hub plate 62b and the plate 62c are riveted by a rivet 65. The driven plate 63 is connected to the turbine hub 51 by means of the rivet 55 such that an inner circumferential side of the driven plate 63 is arranged together with the outer shell 53 of the turbine runner 50, thereby forming a receiving portion for receiving the damper spring 61. The driven plate 63 faces the drive plate 62 in a rotational direction and engages with an end portion of the damper spring 61.

As shown in FIG. 1, the lockup clutch 70 is provided within the front cover 30, and is arranged in an axial direction along with a torus-shaped portion constituted by the pump impeller 40 and the turbine runner 50. The lockup clutch 70 engages the front cover 30 with, or disengages it from, the input shaft 110, via the damper 60. Further, the lockup clutch 70 includes the piston 71 disposed into the piston chamber 80 and a clutch engaging portion 72 which is engaged, or disengaged, by the piston 71.

The piston 71 is of an annular member and when operation oil is supplied to the piston chamber 80 presses the clutch engaging portion 72.

The clutch engaging portion 72 is constituted by the friction discs 62a and friction plates 72a alternately arranged, i.e. of a multi-disc type structure. Dent portions appropriately formed on the outer periphery of the friction plate 72a are capable of engaging with an axial slit 72d formed on a drum member 72b such that the dent portions are slidable in the axial direction. The friction disc 62a is constituted by a core plate on both sides of which friction material is bonded. An inner spline of the friction disc 62a formed on an inner peripheral side thereof engages with an outer spline of the hub plate 62b formed on an outer peripheral side thereof.

The piston chamber 80 is independently defined within the lockup chamber 82 surrounded by the front cover 30 and the pump impeller 40, which are integrally formed. An engaging pressure of the lockup clutch 70 is supplied to the piston chamber 80. Further, the piston chamber 80 corresponds to an area surrounded by the front cover 30, the piston 71, the drum member 72b, and the front cover hub 32. The converter chamber 81 corresponds to an area surrounded by the outer shells 42 and 53. The lockup chamber 82 corresponds to an area surrounded by the front cover 30 and the outer shell 53, but the area of the piston chamber 80 is excluded.

The stator 140 is disposed between the pump impeller 40 and the turbine runner 50, and supported by the stator shaft 141 via the one-way clutch 130, as shown in FIG. 1.

The flow of operation oil in the torque converter with a lockup clutch 10 according to the first embodiment is explained as follows.

Operation oil supplied from the oil supply passage 122 is provided to the converter chamber 81 and the one-way clutch 130. The greater part of the operation oil supplied to the converter chamber 81, after passing through gaps formed among the outer shells 53 and 42, and the front cover 30, flows into the lockup chamber 82. In a case where the lockup clutch 70 is not in engagement state, since a gap formed in the lockup clutch 70 is wide operation oil flowing into the lockup chamber 82 is mainly provided to the oil drain passage 123 through the lockup clutch 70, and partly provided to the oil drain passage 123 through the oil hole 53a. In contrast, in a case where the lockup clutch 70 is in engagement state, since the gap in the lockup clutch 70 is narrow operation oil is partly provided to the oil drain passage 123 through the lockup clutch 70, and mainly provided to the oil drain passage 123 through the oil hole 53a.

At this time, a flow amount of operation oil passing through the oil hole 53a is controlled by the valve member 56. Since an opening defined by the valve member 56 relative to the oil hole 53a is narrow, the flow amount is decreased when the lockup clutch 70 is not in engagement state. In contrast, when the lockup clutch 70 is in engagement state, since an opening defined by the valve member 56 relative to the oil hole 53a is wide, the flow amount increases. The flow amount of operation oil passing through the oil hole 53a is also controlled by the valve member 56 on the basis of the oil temperature. When the temperature of the operation oil is high, the opening defined by the valve member 56 relative to the oil hole 53a is narrow, and thus the flow amount decreases. On the other hand, when the temperature of the operation oil is low, the opening defined by the valve member 56 relative to the oil hole 53a is wide, and thus the flow amount increases. Therefore, pressure in the lockup chamber 82 can be maintained at a substantially constant level even if the temperature of the operation oil varies (see FIG. 4).

The oil drain passage 123 is connected from a flow passage 124 (a bore formed on the turbine hub 51) to a radially inner side portion 83 of the dram member 72b, (a void surrounded by the piston 71 and the lockup clutch 70), a constitutional member of the lockup clutch 70. The oil pressure in the portion from the flow passage 124 to the radially inner side portion 83 is substantially the same as that in the vicinity of the oil drain passage 123. Thus, even if the lockup clutch 70 is in engagement state, the respective pressures in the radially inner side portion 83 and a radially outer side portion of the drum member 72b (i.e. the lockup chamber 82) are substantially equal to each other.

A lockup engagement pressure or a lockup slip pressure is supplied to the piston chamber 80 by means of the shaft oil passage 120 of the input shaft 110, and the lockup oil passage 121 formed between the front cover 30 and the front cover hub 32.

According to the aforementioned first embodiment, operation oil is supplied to the oil drain passage 123 even when the lockup clutch 70 is in the engagement state. Therefore, by means of the flow passage 124 communicating with the oil drain passage 123, the respective oil pressures in the radially inner side portion 83 and the radially outer side portion of the drum member 72b can be prevented from varying from one another. Further, since the flow amount of operation oil is controlled by the valve member 56 on the basis of the oil temperature, the pressure in the converter chamber 81 may be prevented from decreasing even if the oil temperature becomes high.

Figure 5:
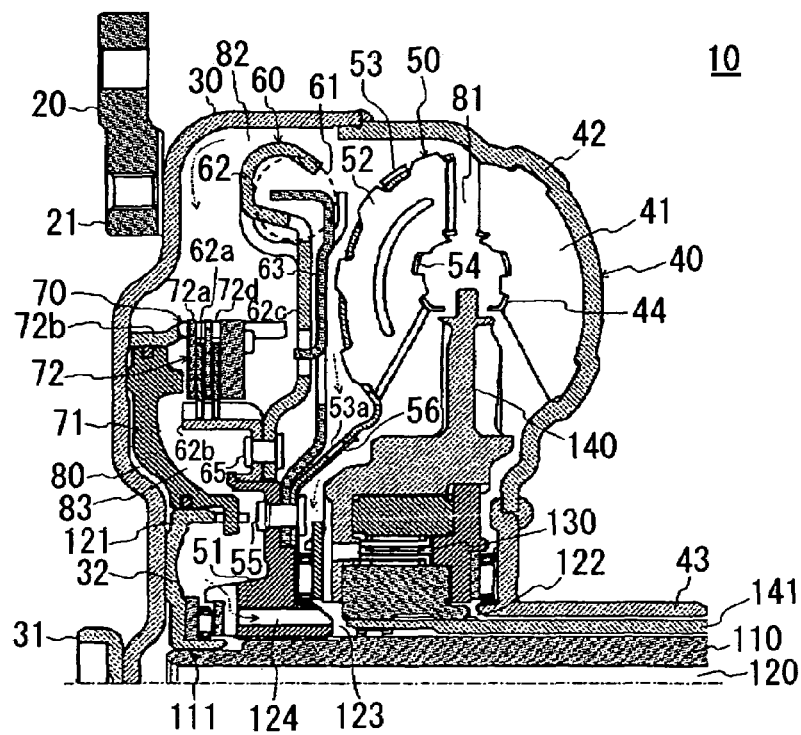
FIG. 5 is a partial cross-sectional view of a torque converter with lockup clutch according to a second embodiment of the present invention.
Figure 6:
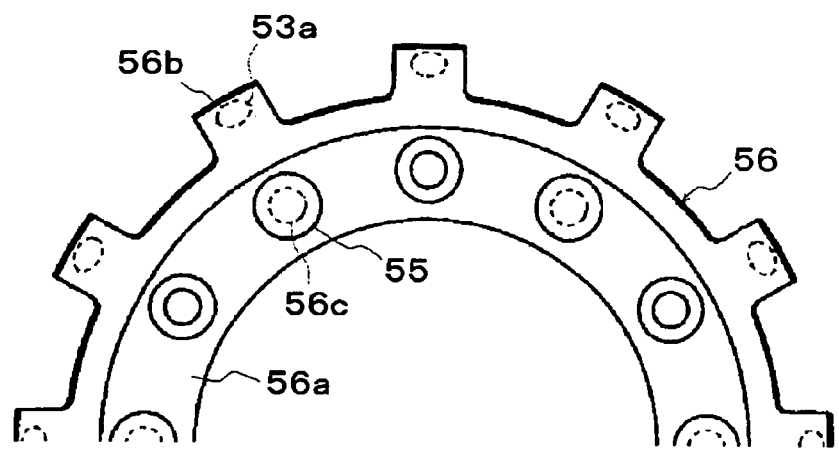
FIG. 6 is a partial plane view of a valve member of the torque converter with lockup clutch according to the second embodiment of the present invention.

A second embodiment of the present invention is explained with reference to the attached drawings. FIG. 5 is a partial cross-sectional view showing a structure of a torque converter with a lockup clutch according to the second embodiment. FIG. 6 is a partial plane view showing a structure of a valve member of the torque converter with a lockup clutch according to the second embodiment. According to the torque converter with a lockup clutch 10 in the second embodiment, the valve member 56 is arranged on an inner wall side of the outer shell 53. The annular portion 56a of the valve member 56 is riveted by means of the rivet 55 relative to the turbine hub 51. The structure other than the above of the torque converter with a lockup clutch according to the second embodiment is same as that of the first embodiment. According to the second embodiment, the effect equal to that of the first embodiment may be achieved.

Figure 7:
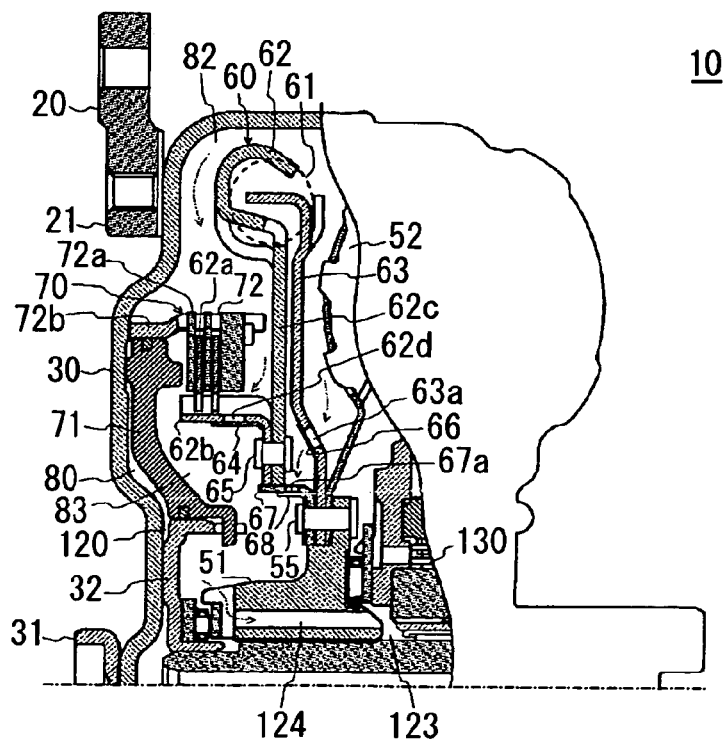
FIG. 7 is a partial cross-sectional view of a torque converter with lockup clutch according to a third embodiment of the present invention.
Figure 8:
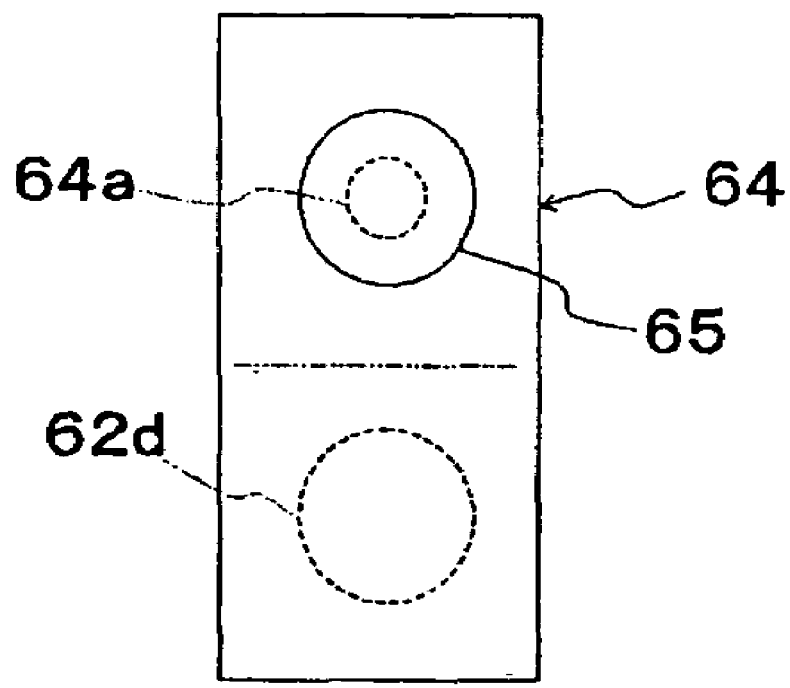
FIG. 8 is a plane view of a valve member of the torque converter with lockup clutch according to the third embodiment of the present invention.

A third embodiment of the present invention is explained with reference to the attached drawings. FIG. 7 is a partial cross-sectional view showing a structure of a torque converter with a lockup clutch according to the third embodiment. FIG. 8 is a plane view of a valve member of the torque converter with a lockup clutch according to the third embodiment.

According to the torque converter with a lockup clutch 10 of the third embodiment, an oil hole 62d is formed on the hub plate 62b of the drive plate 62 instead of the oil hole 53a (see FIG. 1) on the outer shell 53. Then, a valve member 64 for appropriately opening or closing the oil hole 62d is arranged on an inner peripheral side of the drive plate 62. As shown in FIG. 8, the valve member 64 is riveted by means of a rivet 65. The valve member 64 is shown on a plane view for convenience of explanation but is actually bent at a chained-line portion. The valve member 64 may be in a form as shown in FIG. 6. In a case where the valve member 64 is made of thin-plate spring steel, for example, the valve member 64 is constituted so as to close the oil hole 62d in an assembled condition. When the pressure on the oil hole 62d side, i.e. an inner circumferential side, is higher than that on an opposite side of the oil hole 62d, i.e. an outer circumferential side, an opening between the valve member 64 and the oil hole 62d becomes wide, as shown in FIG. 3A. When the pressure on the oil hole 62d side is lower than that on the opposite side of the oil hole 62d, an opening between the valve member 64 and the oil hole 62d narrows as shown in FIG. 3B. In a case where the valve member 64 is made of a temperature-sensitive member such as a bi-metal, or a shape-memory alloy, an opening between the valve member 64 and the oil hole 62d becomes wide when the oil temperature is low, and narrows when the oil temperature is high as shown in FIGS. 3A and 3B.

The flow of operation oil in the torque converter with a lockup clutch 10 according to the third embodiment is explained as follows. Operation oil supplied from the oil supply passage (corresponds to the oil supply passage 122 in FIG. 1) is provided to the converter chamber (corresponds to the convert chamber 81 in FIG. 1). The greater part of the operation oil supplied to the converter chamber 81, after passing through gaps formed among the outer shells 53 and 42, and the front cover 30, flows into the lockup chamber 82. In a case where the lockup clutch 70 is not in engagement state, operation oil flowing into the lockup chamber 82 is mainly provided to the oil drain passage 123 through the lockup clutch 70, and partly provided to the oil drain passage 123 through the oil hole 62d and the flow passage 124. In contrast, in a case where the lockup clutch 70 is in engagement state, operation oil is partly provided to the oil drain passage 123 through the lockup clutch 70, and mainly provided to the oil drain passage 123 through the oil hole 62d. In this case, a flow amount of operation oil passing through the oil hole 62d is controlled by the valve member 64. Since an opening of the valve member 64 relative to the oil hole 62d is narrow, the flow amount decreases when the lockup clutch 70 is not in engagement state. In contrast, when the lockup clutch 70 is in the engagement state, since an opening of the valve member 64 relative to the oil hole 62d is wide, the flow amount increases. Further, the flow amount of operation oil passing through the oil hole 62d is controlled by the valve member 64 on the basis of the oil temperature. When the temperature of operation oil is high, the opening of the valve member 64 relative to the oil hole 62d is narrow and thus the flow amount decreases. On the other hand, when the temperature of operation oil is low, the opening of the valve member 64 relative to the oil hole 62d is wide and thus the flow amount increases.

An oil hole 63a may be formed on the driven plate 63, and a valve member 66 for appropriately opening and closing the oil hole 63a may be riveted by means of the rivet 55, in the same way as the oil hole 62d and the valve member 64.

Further, an oil hole 67a may be formed on a hub member 67 that is riveted by means of the rivet 55, and a valve member 68 for opening and closing the oil hole 67a may be riveted by means of the rivet 55 in the same way as the oil hole 62d and the valve member 64.

Further more, an oil hole (not shown) into which flows operation oil supplied from the converter chamber 81 to the lockup chamber 82, and is connected to the oil drain passage 123 without passing through (engaging portion of) the lockup clutch 70 may be appropriately formed in addition to a valve member (not shown) for appropriately opening and closing the oil hole.

Respective pairs of the oil hole 62d and the valve member 64, the oil hole 63d and the valve member 66, and the oil hole 67a and the valve member 68, are not necessarily provided all at once. At least one pair is required.

According to the third embodiment, operation oil is supplied to the oil drain passage 123 through the oil hole 62d even if the lockup clutch 70 is in engagement state. Therefore, the respective oil pressures in the radially inner side portion 83 (void surrounded by the piston 71 and the lockup clutch 70) and the radially outer side portion of the drum member 72b (lockup chamber 82) can be prevented from varying from one another. Further, since the flow amount of operation oil is controlled by the valve member 64 on the basis of the oil temperature, the pressure in the converter chamber 81 may be prevented from decreasing even if the oil temperature becomes high.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the sprit of the present invention. Accordingly, it is expressly intended that all such variations, changes and equivalents which fall within the spirit and scope of the present invention as defined in the claims, be embraced thereby.

The invention claimed is:

1. A torque converter with a lockup clutch for transmitting power by engaging a pump impeller and a turbine runner, comprising:
    a fluid passage into which flows operation oil supplied from a converter chamber, which is surrounded by the pump impeller and the turbine runner, to a lockup chamber in which engagement and disengagement of the lockup clutch are performed, the fluid passage being connected to an oil drain passage for the operation oil without passing through an engaging portion of the lockup clutch; and
    a valve provided at a point on the fluid passage to control a flow amount of operation oil,
    wherein an opening of the valve becomes wide when a difference in pressure between the lockup chamber and the oil drain passage is large, and the opening of the valve narrows when a difference in pressure between the lockup chamber and the oil drain passage is small.

2. A torque converter with a lockup clutch according to claim 1, wherein the valve is constituted by a temperature-sensitive valve of which an opening becomes wide when a temperature of the operation oil is low, and narrows when a temperature of the operation oil is high.

3. A torque converter with a lockup clutch according to claim 2, wherein the lockup clutch is a multi-disc type clutch.

4. A torque converter with a lockup clutch according to claim 1, wherein the lockup clutch is a multi-disc type clutch.

5. A torque converter with a lockup clutch for transmitting power by engaging a pump impeller and a turbine runner, comprising:
    an oil hole formed on a predetermined member and into which flows operation oil supplied from a converter chamber, which is surrounded by the pump impeller and the turbine runner, to a lockup chamber in which engagement and disengagement of the lockup clutch are performed, the oil hole being connected to an oil drain passage for the operation oil without passing through an engaging portion of the lockup clutch; and
    a valve member provided on a downstream side of the predetermined member to control a flow amount of operation oil passing through the oil hole,
    wherein the valve member is constituted by a leaf valve of which an opening becomes wide when a difference in pressure between the lockup chamber and the oil drain passage is large, and narrows when a difference in pressure between the lockup chamber and the oil drain passage is small.

6. A torque converter with a lockup clutch according to claim 5, wherein the valve is constituted by a temperature-sensitive valve of which an opening becomes wide when a temperature of the operation oil is low, and narrows when a temperature of the operation oil is high.

7. A torque converter with a lockup clutch according to claim 6, wherein the lockup clutch is a multi-disc type clutch.

8. A torque converter with a lockup clutch according to claim 5, wherein the lockup clutch is a multi-disc type clutch.

9. A torque converter with a lockup clutch for transmitting power by engaging a pump impeller and a turbine runner, comprising:
    an oil hole formed on an outer shell of the turbine runner and into which flows operation oil supplied from a converter chamber, which is surrounded by the pump impeller and the turbine runner, to a lockup chamber in which engagement and disengagement of the lockup clutch are performed, the oil hole being connected to an oil drain passage for the operation oil without passing through an engaging portion of the lockup clutch; and
    a valve member provided on an inner wall face side of the outer shell to control a flow amount of operation oil passing through the oil hole,
    wherein the valve member is constituted by a leaf valve of which an opening becomes wide when a difference in pressure between the lockup chamber and the oil drain passage is large, and narrows when a difference in pressure between the lockup chamber and the oil drain passage is small.

10. A torque converter with a lockup clutch according to claim 9, wherein the valve is constituted by a temperature-sensitive valve of which an opening becomes wide when a temperature of the operation oil is low, and narrows when a temperature of the operation oil is high.

11. A torque converter with a lockup clutch according to claim 9, wherein the lockup clutch is a multi-disc type clutch.

* * * * *